US012783152B2

(12) United States Patent
Segev et al.

(10) Patent No.: US 12,783,152 B2
(45) Date of Patent: Nov. 3, 2026

(54) AUTHENTICATION OF SANITIZE ERASE

(71) Applicant: Sandisk Technologies, Inc., Milpitas, CA (US)

(72) Inventors: Amir Segev, Meiter (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/950,918

(22) Filed: Nov. 18, 2024

(65) Prior Publication Data

US 2025/0077111 A1 Mar. 6, 2025

Related U.S. Application Data

(63) Continuation of application No. 18/353,860, filed on Jul. 17, 2023, now Pat. No. 12,175,114.

(51) Int. Cl.
*G06F 3/06* (2006.01)

(52) U.S. Cl.
CPC .......... *G06F 3/0652* (2013.01); *G06F 3/0619* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,471,232 B2 | 10/2016 | Koren et al. | |
| 10,587,590 B2 | 3/2020 | Trantham et al. | |
| 11,093,165 B2 | 8/2021 | Aponte et al. | |
| 11,328,069 B2 | 5/2022 | Le Gargean et al. | |
| 2012/0278564 A1 | 11/2012 | Goss et al. | |
| 2016/0117245 A1 | 4/2016 | Vaisanen et al. | |
| 2016/0300069 A1 | 10/2016 | Anil et al. | |
| 2020/0097206 A1 | 3/2020 | Aponte et al. | |
| 2021/0064267 A1 | 3/2021 | Hubbard et al. | |
| 2022/0075549 A1 | 3/2022 | Brandt et al. | |
| 2023/0214154 A1* | 7/2023 | Li ......................... | G06F 3/0604 711/154 |

OTHER PUBLICATIONS

Wei, et al., "Reliably Erasing data from Flash-Based Solid State Drives", (c) Dec. 17, 2010 Department of Computer Science and Engineering, University of California, San Diego, p. 1-13. (Year: 2010).*
Michael Wei et al., "Reliably Erasing Data From Flash-Based Solid State Drives", Department of Computer Science and Engineering, University of California, San Diego, 2011.
International Search Report and Written Opinion for Application No. PCT/US2024/029891 filed May 17, 2024.

* cited by examiner

*Primary Examiner* — Brian R Peugh
(74) *Attorney, Agent, or Firm* — Patterson + Sheridan, LLP

(57) ABSTRACT

Adding a bypass module and a pattern detector module to a data path of a controller will increase the efficiency of both sanitize block erase audit and sanitize crypto erase audit operations. The sanitize crypto erase audit skips an end to end (E2E) protection module to provide decrypted data to a static random access memory (SRAM) buffer and ultimately a host device through a direct memory access (DMA) module. The sanitize block erase audit utilizes the pattern detector module to provide a known pattern to the SRAM buffer and host through the DMA module. The bypass module and pattern detector module feed into a multiplexer (Mux) prior to the SRAM buffer.

13 Claims, 6 Drawing Sheets

200

| | |
|---|---|
| 02:00 | Sanitize Action (SANACT): This field specifies the sanitize action to perform |

| Value | Description |
|---|---|
| 000b | Reserved |
| 001b | Exit Failure Mode |
| 010b | Start a Block Erase sanitize operation |
| 011b | Start an Overwrite sanitize operation |
| 100b | Start a Crypto Erase sanitize operation |
| 101b to 111b | Reserved |

FIG. 2

AUTHENTICATION OF SANITIZE ERASE

CROSS-REFERENCE TO RELATED APPLICATIONS

This application is a continuation of co-pending U.S. patent application Ser. No. 18/353,860, filed Jul. 17, 2023, which is herein incorporated by reference.

BACKGROUND OF THE DISCLOSURE

Field of the Disclosure

Embodiments of the present disclosure generally relate to improving sanitize erase audit mode in data storage devices.

Description of the Related Art

One of the requirements for nonvolatile memory (NVM) express (NVMe) devices is the support for sanitize commands. Sanitize commands are basically reading the data that was just erased/deleted to confirm that the erase/deletion actually occurred. Based upon the type of sanitize process, there may still be an expectation of receiving actual data. The sanitize command has three different flavors: overwrite, crypto erase, and block erase.

Sanitize overwrite actions involve a known pattern used to fill an entire solid state drive (SSD). The known pattern is typically provided by a host device. Sanitize crypto erase actions involve throwing away keys that were used to encrypt data. In so doing, the data becomes garbage because there is no key to be able to decrypt the data. Sanitize block erase actions involve completely erasing the media.

One of the new requirements in SSD technology is the ability for the host device to audit an erase operation. Auditing means that the host device will be able to confirm that the sanitize command has been executed. The auditing can consume a significant amount of bandwidth and, oftentimes, incur performance penalties due to decoding operations.

Therefore, there is a need in the art for improved auditing of sanitize operations.

SUMMARY OF THE DISCLOSURE

Adding a bypass module and a pattern detector module to a data path of a controller will increase the efficiency of both sanitize block erase audit and sanitize crypto erase audit operations. The sanitize crypto erase audit skips an end to end (E2E) protection module to provide decrypted data to a static random access memory (SRAM) buffer and ultimately a host device through a direct memory access (DMA) module. The sanitize block erase audit utilizes the pattern detector module to provide a known pattern to the SRAM buffer and host through the DMA module. The bypass module and pattern detector module feed into a multiplexer (Mux) prior to the SRAM buffer.

In one embodiment, a data storage device comprises: a memory device; and a controller coupled to the memory device, wherein the controller is configured to: detect that a pattern detector has been set to active after a sanitize block erase operation; read data from the memory device, wherein the read data corresponds to a location erased in the sanitize block erase operation; determine whether the read data matches a known pattern; and either: write the known pattern to static random access memory (SRAM) and pass the read data to a host device; or emulate an end to end error and provide a command completion message with error to the host device.

In another embodiment, a data storage device comprises: a memory device; and a controller coupled to the memory device, wherein the controller is configured to: detect that a bypass module has been set to active after a sanitize crypto erase operation; read data from the memory device, wherein the read data corresponds to a location erased in the sanitize crypto erase operation; store the read data in a second static random access memory (SRAM) buffer; perform error correction on the read data; decrypt the read data; bypass an end to end (E2E) protection module; store the decrypted read data in a first SRAM buffer; and pass the read data to a host device.

In another embodiment, a data storage device comprises: means for storing data; and a controller coupled to the means for storing data, wherein the controller is configured to: a control path comprising a central processing unit (CPU) and an audit mode module; and a data path comprising a direct memory access (DMA) module; a first static random access memory (SRAM) buffer; a Mux, an end to end (E2E) protection module, a bypass module, a keys module, an encryption (XTS) module; an error correction module; a pattern detector module; a second SRAM buffer, and a flash interface module (FIM), wherein the controller is configured to: perform a pattern detection operation in a sanitize block erase audit mode or a bypass of the E2E module in a sanitize crypto erase audit mode.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is table listing the sanitize actions possible.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Adding a bypass module and a pattern detector module to a data path of a controller will increase the efficiency of both sanitize block erase audit and sanitize crypto erase audit operations. The sanitize crypto erase audit skips an end to end (E2E) protection module to provide decrypted data to a static random access memory (SRAM) buffer and ultimately a host device through a direct memory access (DMA) module. The sanitize block erase audit utilizes the pattern detector module to provide a known pattern to the SRAM buffer and host through the DMA module. The bypass module and pattern detector module feed into a multiplexer (Mux) prior to the SRAM buffer.

Figure 1:
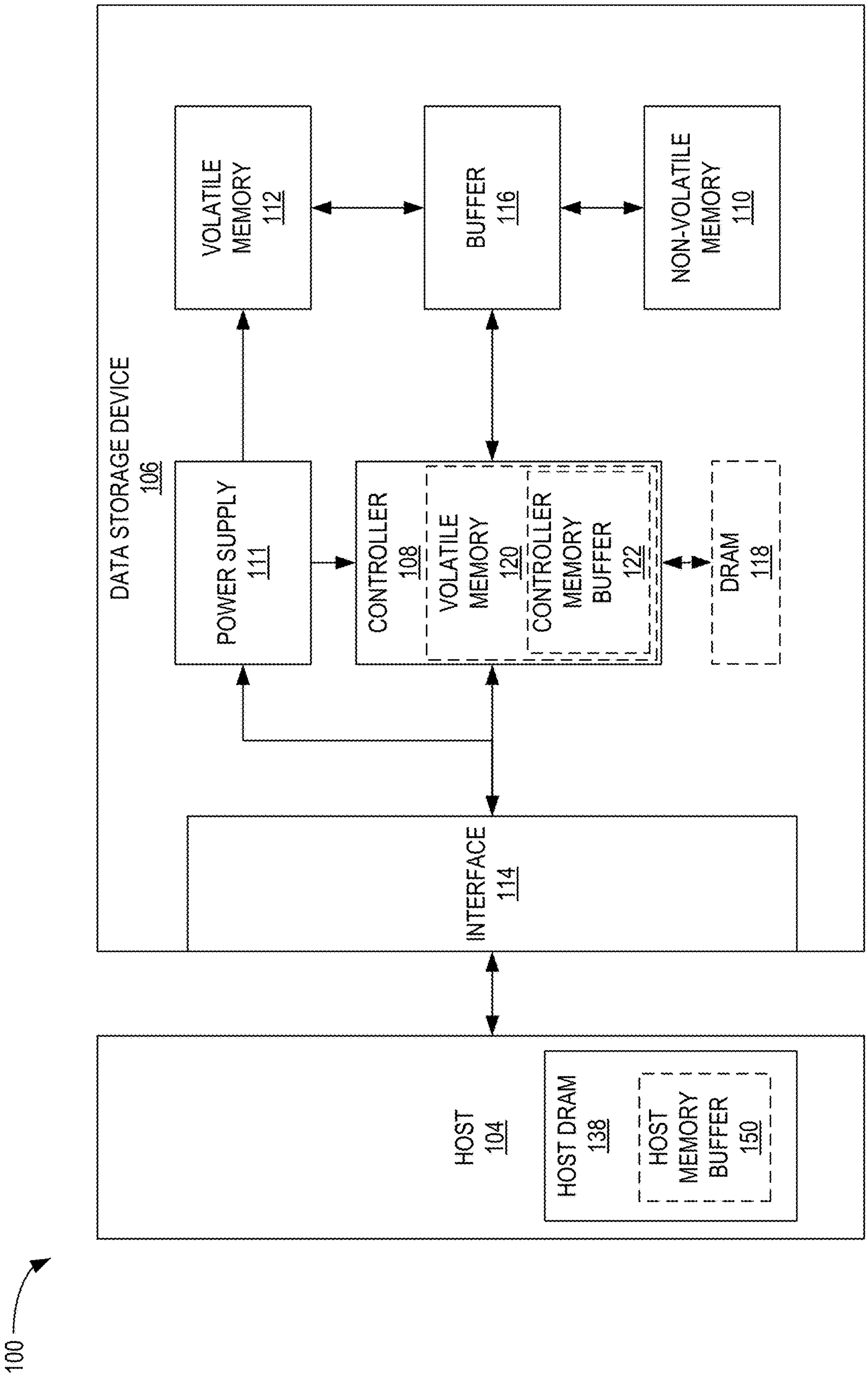
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

The data storage device contains both NVMe protection information (PI) and typically local end-2-end (E2E) check information. Following a crypto erase, any read of the drive data will yield both E2E protection failures, and NVMe-PI failures. As a result, the command will be aborted with errors, and data might/might-not be sent to the host. When the host gets the completion with a failure, the host does not know if the failure was due to a real E2E issue, or because of the sanitize command. For this reason, it is suggested that following a sanitize operation the data storage device will enter an “audit mode”.

Figure 3:
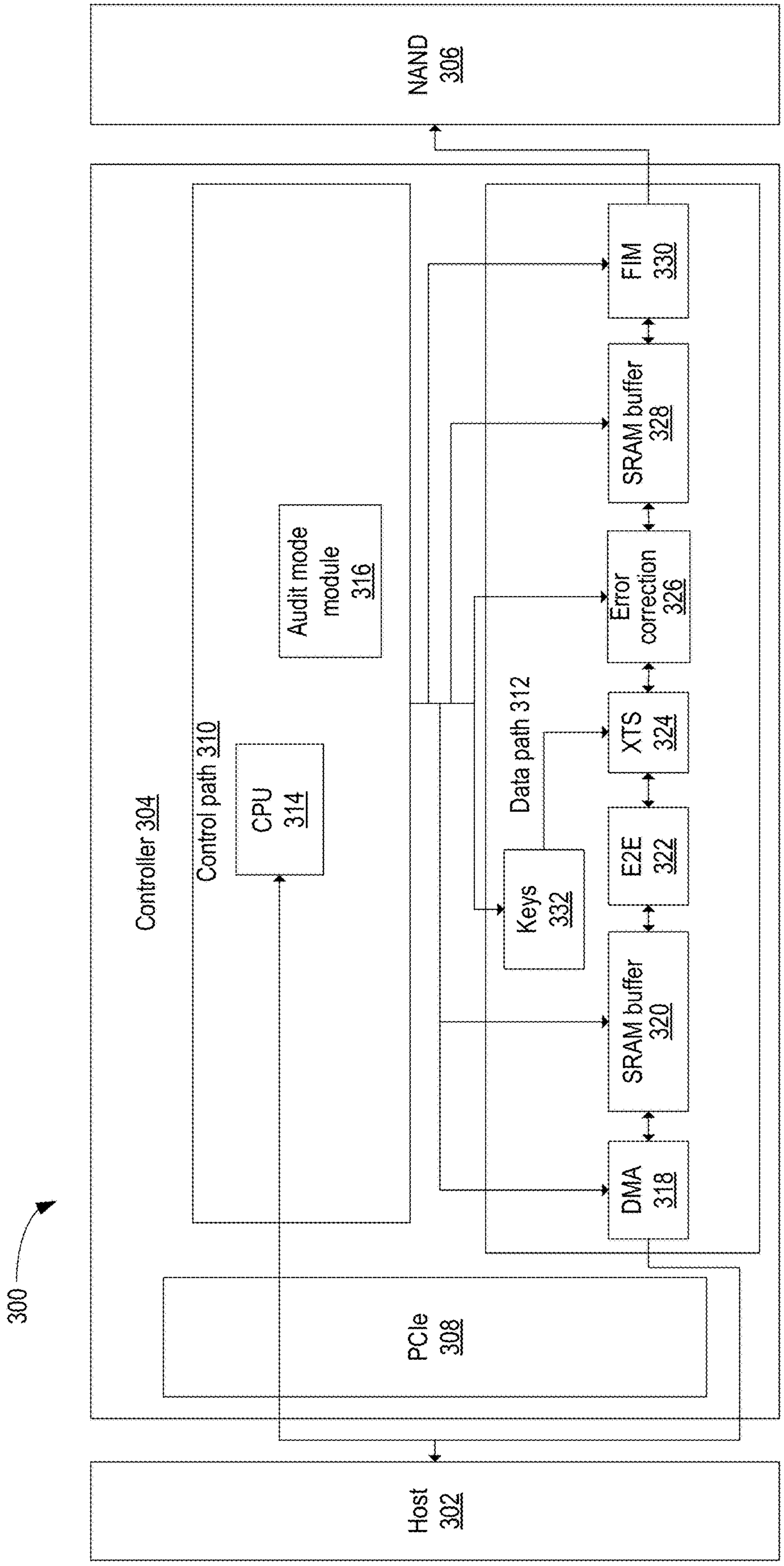
FIG. 3 is a schematic illustration of a system according to one embodiment.

FIG. 2 is table 200 listing the sanitize actions possible. FIG. 3 is a schematic illustration of a system 300 according to one embodiment. The system 300 is capable of supporting crypto erase audits. The system 300 includes a host 302, memory device (e.g., NAND array) 306, and controller 304. The controller 304 contains a PCIe bus 308 as an example of the transport layer. The controller 304 also contains a control path 310 with a central processing unit (CPU) 314 capable of marking “audit mode”, and a data path 312 with multiple engines. The data path 312 includes a flash interface module (FIM) 330 used to write and read data to/from memory device 306. The data path 312 also includes a first static random access memory (SRAM) buffer 320 to hold data prior to encryption or after decryption. A direct memory access (DMA) module 318 is also present to do the actual transfers over the PCIe bus 308. An end to end (E2E) module 322 is present as a data generator for the write path and checker for the read path. An encryption engine (i.e., XTS module) 324 is also present and has coupled memory (e.g., key module) 332 containing encryption keys. The error correction module 326 is used to decipher the data being read, and the second SRAM buffer 328 holds data between the error correction module 326 and the FIM 330.

In a normal write flow, the control path 310 will trigger the DMA 318 to fetch data from the host 302, add E2E protection information, pass the data through encryption, add error correction information to the payload, and finally instruct the FIM 330 to write the data to the memory device 306. In a normal read flow, the reverse is done. The FIM 330 fetches the data from the memory device 306, the error correction module 326 decodes the data, the XTS module 324 decrypts the data, the E2E module 322 checks the data integrity, and finally the DMA 318 writes the data to the host 302.

For sanitize overwrite actions, the operation flow is as follows: the CPU 314 fills the SRAM buffer 320 with data, then the CPU 314 then triggers the remaining data path 312 engines: E2E protection is added, data is encrypted using the XTS module 324, error correction codes are added to the payload, and the FIM 330 writes the data to the memory device 306. A sanitize overwrite audit may be performed using the following flow whereby the CPU 314 triggers the data path 312 engines. The FIM 330 reads the data from the memory device 306. The data is stored in the SRAM buffers 328 and error correction is performed on the data using the error correction module 326. The data is then decrypted by the XTS module 324 and the E2E protection is checked using the E2E module 322. The data is then stored in the SRAM buffer 320, and the DMA 318 delivers the data to the host 302 where the host 302 can compare the data to the provided payload.

For sanitize crypto erase actions, the following flow is typically followed: the CPU 314 deletes the crypto keys 332. For the sanitize crypto erase audit mode, the typical read operations flow is as follows: the CPU 314 triggers a first part of the data path 312 engines whereby the FIM 330 reads data from the memory device 206, data is then stored in the SRAM buffer 328, and error correction is performed on the read data using the error correction module 326. The data is decrypted using the XTS module 324 and the E2E protection is checked using the E2E module 322. The E2E protection check is where the read will fail during the typical sanitize crypto erase audit. The data is then stored in the SRAM buffer 320. The CPU 314 then alters the E2E protection information (i.e., fixes the read failure) and then triggers the DMA 318 to pass the data to the host 302 where the host 302 can compare the data to the garbage payload. In sanitize crypto erase audit mode, the CPU 314 breaks the audit read into three parts, breaking the read automation. The CPU 314 intervention in this case is small, but still bears some effect on the bandwidth.

In a sanitize block erase operation, an erased block cannot be decoded by the error correction module 326 due to the fact that not all bits pattern are legal, patterns are added some "distance" between them to allow for better data decoding. To be more specific, the actual bits stored in the memory device 306 after the erase resolve into an illegal pattern. The typical sanitize block erase operation flow is simply to have the CPU 314 instruct the FIM 330 to issue an erase command. In a typical sanitize block erase audit operation, the host will still expect to receive some pattern. As discussed below, the two SRAMs are the break points that make the typical process complicated. The error correction will fail in the typical sanitize block erase audit because error correction does not necessarily know how to handle a code of all '1'. Because all '1' would not be valid, the error correction will fail. The typical sanitize block erase audit read operation flow may comprise: the CPU 314 triggering the first part of the data path 312 engines, specifically the FIM 330 reads data from the memory device 306 and the data is stored in the SRAM buffer 328. The CPU 314 then reads the data from the SRAM buffer 328 and compares the data to the 'erase pattern'. The CPU 314 then alters the DMA 318 controls to point at a data location with a known fixed pattern. The CPU 314 then triggers the DMA 318 to fetch the data from the dedicated location. In so doing, the DMA 318 passes the fetched data to the host 302 where the host 302 can compare the data to the 'erased' payload. In this mode, the CPU 314 handles not only the controls, but also the data (data comparison). Additionally, the amount of control is large. The flow entirely breaks the hardware (HW) automation, having a big impact on bandwidth.

As will be discussed herein, the solution is to support the block erase audit mode without ruining the bandwidth. Additional embodiments herein help with the crypto erase audit. Using the typical audits discussed above, the bandwidth is ruined, making the audits of the sanitizations un-useful. An alternative sanitize approach is possible, but such an approach would be cheating the sanitize operations since the alternative would involve simply not reading from the Memory device during the sanitization process.

The solutions discussed herein is to add a pattern matching (for the block erase) and bypass (for the crypto erase) that works during audit mode. The solutions reduce CPU involvement in the audit read operations and improves transparency by creating a fixed hardware transformation that can be audited independently.

Figure 4:
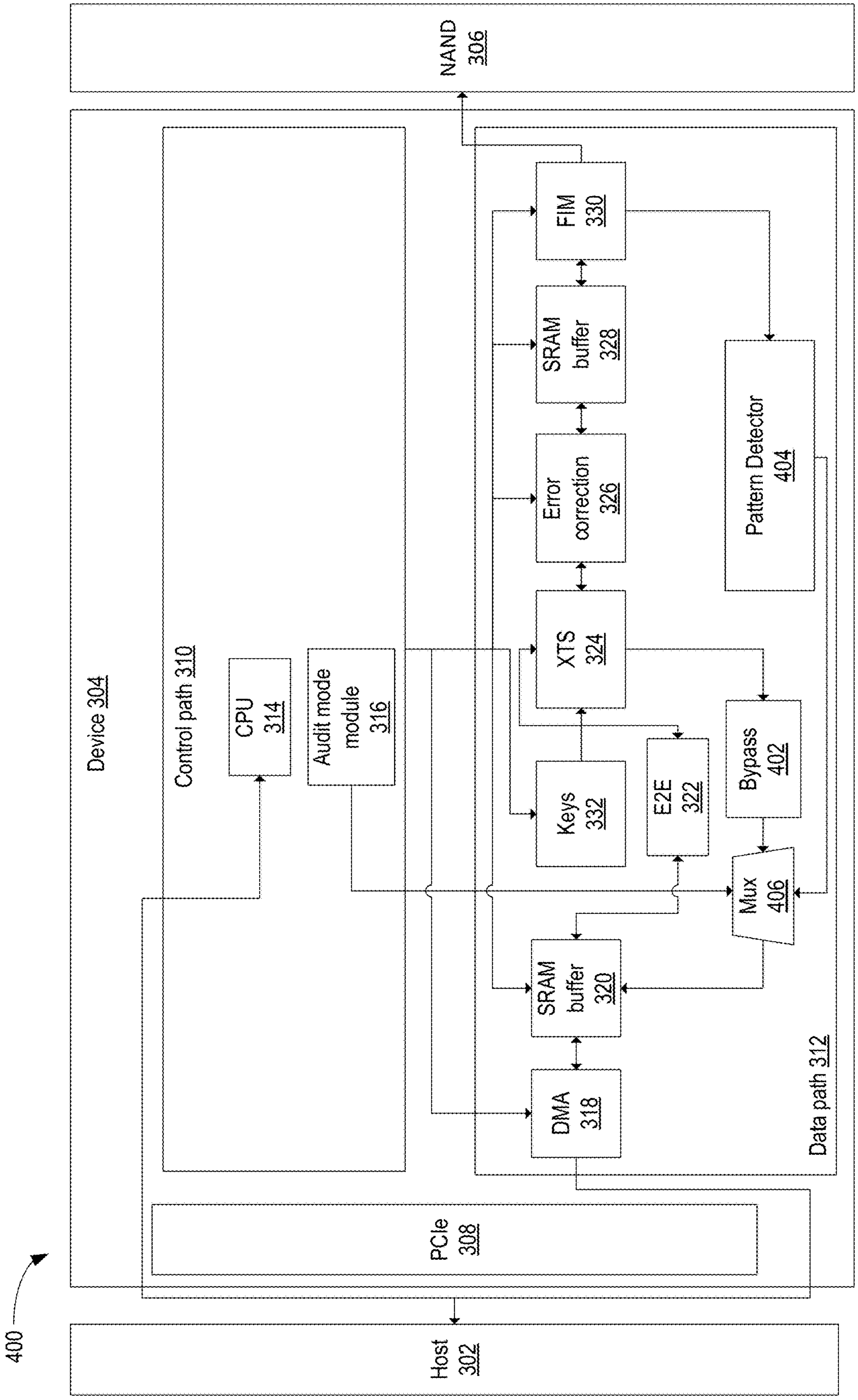
FIG. 4 is a schematic illustration of a system according to another embodiment.

FIG. 4 is a schematic illustration of a system 400 according to another embodiment. The system 300 includes the DMA 318 coupled to the SRAM buffer 320 which is coupled to the E2E module 322. The E2E module 322 is coupled to the XTS module 324 that is coupled to the key module 332. The XTS module 324 is also coupled to the error correction module 326 while the error correction module 326 is coupled to the SRAM buffer 328. The SRAM buffer 328 is coupled to the FIM 330.

The data path 312 also includes a multiplexer (Mux) 406, a bypass module 402, and a pattern detector module 404. The Mux 406 receives inputs from the pattern detector module 404 and the bypass module 402. The Mux 406 also receives input from the audit mode module 316 of the control path 310. The Mux 406 outputs to the SRAM buffer 320. The bypass module 402 receives input from the XTS module 324 such that data from the XTS module 324 travels through the bypass module 402 rather than the E2E module 322. In other words, the data skips the E2E module 322 and pass through the bypass module 402 and Mux 406 instead. The pattern detector module 404 receives input from the FIM 330. Data passes through the FIM 330 and then the pattern detector 303 and then the Mux 406 prior to the SRAM buffer 320 and DMA 318. The data may still pass through the SRAM buffer 328, error correction module 326, XTS module 324, and E2E module 322, but any data from the E2E module 322 will be ignored. In fact, the E2E module, the XTS module 324, error correction module 326, and SRAM buffer 328 may be placed in idle state during an audit utilizing the pattern detector module 404. The bypass module 402 and Mux 406 will be used during a crypto erase audit read while the pattern detector module 404 and Mux 406 will be utilized during a block erase audit read. The modules of the data path 312 are HW modules while the modules of the control path 310 are firmware (FW) modules.

Figure 5:
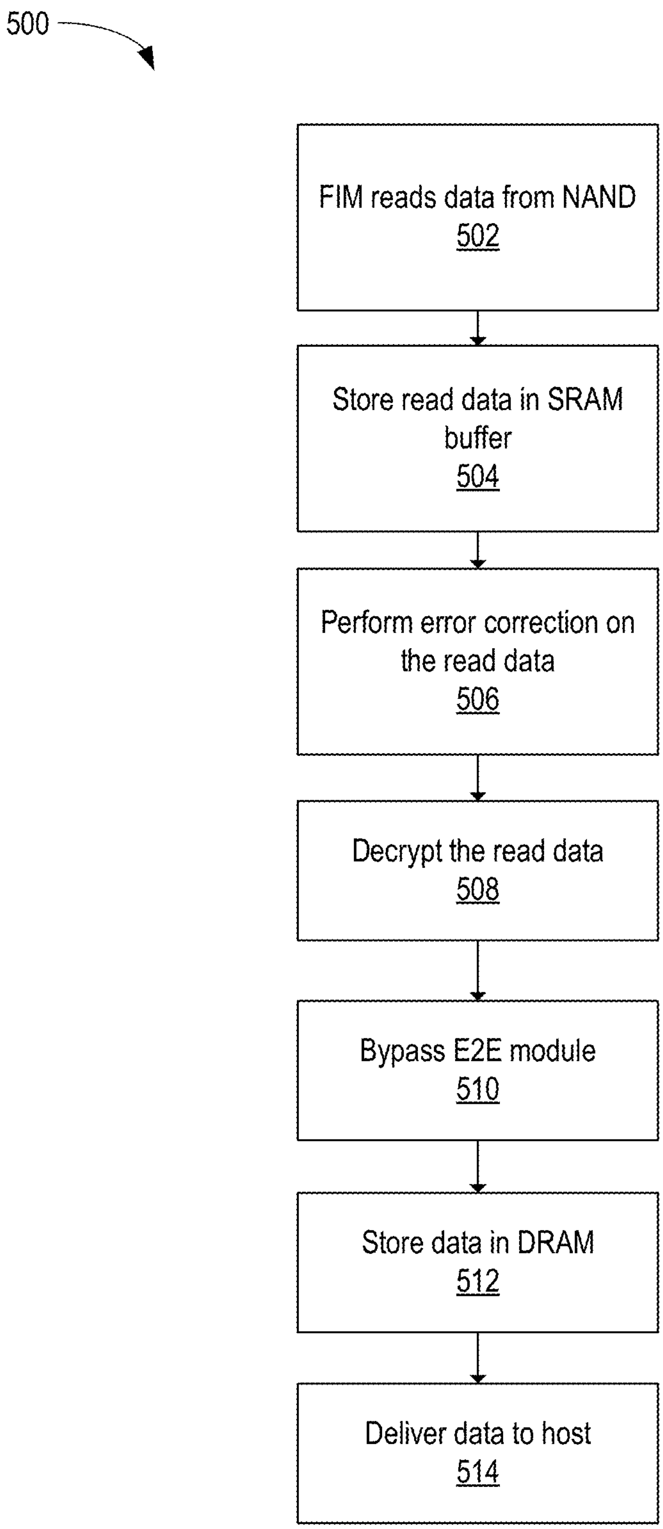
FIG. 5 is a flowchart illustrating a sanitize crypto erase audit according to one embodiment.

For a sanitize crypto erase operation, the CPU 314 will delete the crypto keys stored in the key module 332, and the CPU 314 will set the bypass module 402 to active. For a sanitize crypto erase audit, the flow will also change. FIG. 5 is a flowchart 500 illustrating a sanitize crypto erase audit according to one embodiment. During the sanitize crypto erase audit, the CPU 314 will trigger the entire data path 312. More specifically, the FIM 330 will read data from the Memory device 306 at 502. The data will then be stored in SRAM buffers 328 at 504. Error correction will be performed on the data at 506 using the error correction module 326. The data will then be decrypted at 508 using the XTS module 324. While the E2E module 322 is working and producing results on the read data, the results are bypassed at 510 using the bypass module 402 and Mux 406. The results, due to the bypass, are considered successful. States another way, the E2E checking is skipped. The data is then stored in the SRAM buffer 320 at 512. The DMA 318 then passes the data to the host 302 at 514 where the host can compare the data to the garbage payload.

Figure 6:
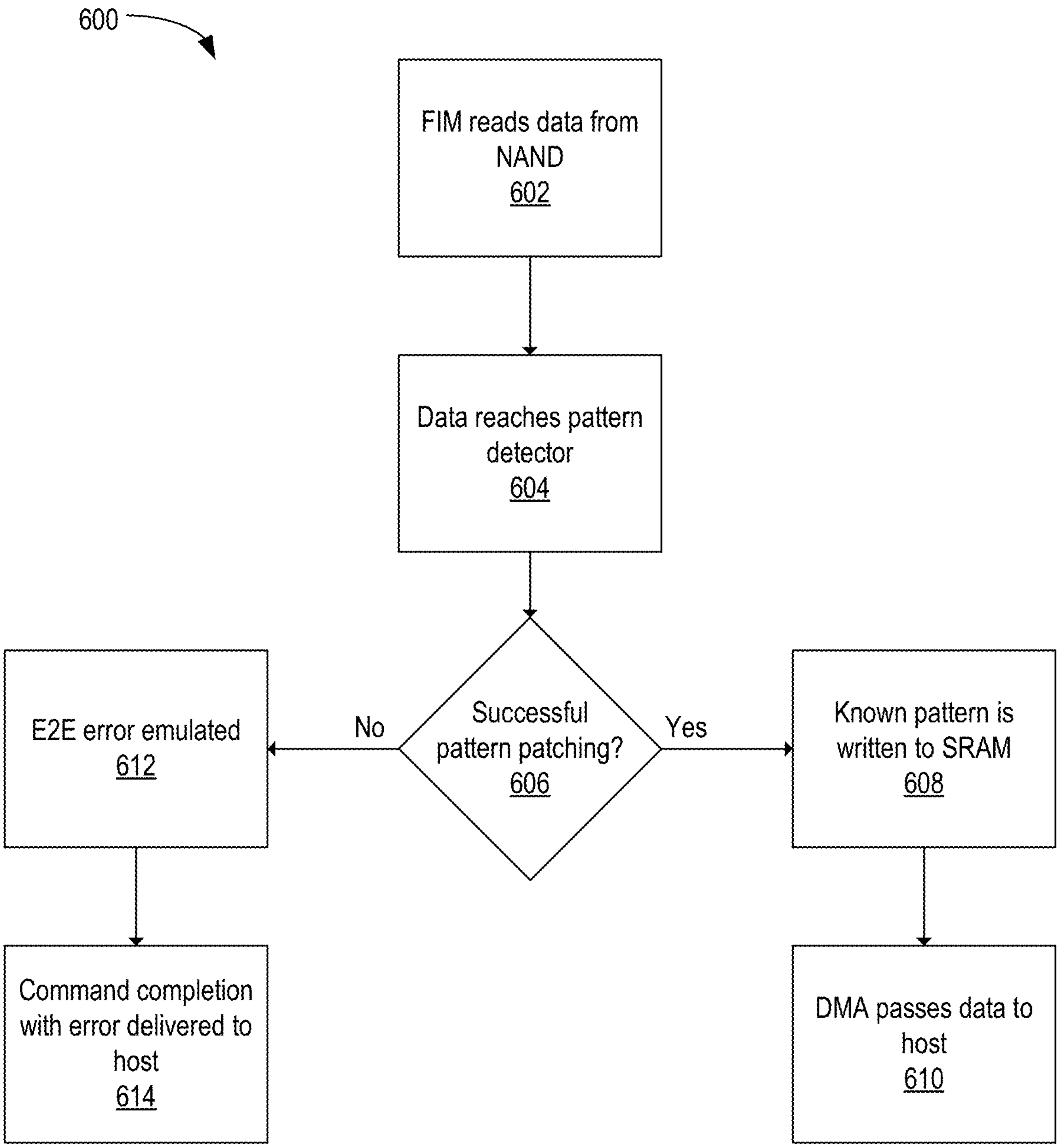
FIG. 6 is a flowchart illustrating a sanitize block erase audit according to one embodiment.

For a sanitize block erase operation, the CPU 314 will instruct the FIM 330 to issue an erase command and the CPU 314 will set the pattern detector module 404 to active. For a sanitize block erase audit, the flow will also change. FIG. 6 is a flowchart 600 illustrating a sanitize block erase audit according to one embodiment. During the sanitize block erase audit, the CPU 314 will trigger the entire data path 312. More specifically, the FIM 330 will read data from the memory device 306 at 602. The data will then reach the pattern detector module 404 at 604. A determination is then made regarding whether there had been a successful erase block pattern matching at 606. If there have been a successful erased block pattern matching, then the known pattern is written to SRAM 320 by the Mux 406 at 608 and the DMA 318 passes the data to the host 302 at 610 where the host 302 can compare the data to the garbage payload. If there has not been a successful pattern matching at 606, then an E2E error is emulated at 612 and a command completion with error is delivered to the host 302 by the DMA 318 at 614. An unsuccessful pattern matching is a failure that occurs if there is no pattern. It is to be noted that the host 302 cannot decide whether the audit succeeded or not. The process will detect a pattern of all '1' without a need for FW intervention To not have a different FW for audit mode (different control to HW engines), all other HW engines (i.e., error correction, XTS, E2E checkers) can still be active, but their activity will not affect the read results and they are bypassed. Alternatively, the engines might be left in the idle state to save more power.

By adding pattern detecting (or matching) and bypass options, the HW is responsible for the data path automation with no need to change the HW or FW flows. The only additional control operations are done at the sanitize operation prior to entering the audit mode and not per read command. The audit mode works at a high performance level making the features useable at a very small cost to HW and no cost to FW. Additionally, the pattern matcher can be audited by introducing different fixed patterns, ensuring verifiable block erase results without the performance penalties of decodable overwrite patterns.

In one embodiment, a data storage device comprises: a memory device; and a controller coupled to the memory device, wherein the controller is configured to: detect that a pattern detector has been set to active after a sanitize block erase operation; read data from the memory device, wherein the read data corresponds to a location erased in the sanitize block erase operation; determine whether the read data matches a known pattern; and either: write the known pattern to static random access memory (SRAM) and pass the read data to a host device; or emulate an end to end error and provide a command completion message with error to the host device. The controller is configured to set the pattern detector to active after instructing a flash interface module (FIM) to issue an erase command in the sanitize block erase operation. The controller includes a central processing unit (CPU) and wherein the CPU is configured to trigger a data path of the controller. The CPU is also configured to instruct a flash interface module (FIM) to issue an erase command in the sanitize block erase operation. The CPU is also configured to set the pattern detector to active. The controller comprises one or more of a direct memory access module (DMA), a first SRAM buffer, a Mux, an end to end (E2E) protection module, a bypass module, an error correction module, a pattern detector module, a second SRAM buffer, a flash interface module (FIM), and an encryption (XTS) module. One or more of the E2E protection module, the encryption module, the error correction module, and the second SRAM buffer are in idle mode during the detecting, reading, and determining.

In another embodiment, a data storage device comprises: a memory device; and a controller coupled to the memory device, wherein the controller is configured to: detect that a bypass module has been set to active after a sanitize crypto erase operation; read data from the memory device, wherein the read data corresponds to a location erased in the sanitize crypto erase operation; store the read data in a second static random access memory (SRAM) buffer; perform error correction on the read data; decrypt the read data; bypass an end to end (E2E) protection module; store the decrypted read data in a first SRAM buffer; and pass the read data to a host device. The controller is configured to set the bypass module to active after instructing a central processing unit (CPU) to delete crypto keys. The controller includes a central processing unit (CPU) and wherein the CPU is configured to trigger a data path of the controller. The CPU is also configured to delete crypto keys in a keys module of a data path of the controller. The CPU is also configured to set the bypass module to active. The controller comprises one or more of a direct memory access module (DMA), a Mux, an end to end (E2E) protection module, and an encryption (XTS) module, and wherein the bypass module is coupled between the XTS module and the Mux. The E2E protection module is in idle mode during the detecting, reading, storing, performing, decrypting, bypassing, storing, and passing.

In another embodiment, a data storage device comprises: means for storing data; and a controller coupled to the means for storing data, wherein the controller is configured to: a control path comprising a central processing unit (CPU) and an audit mode module; and a data path comprising a direct memory access (DMA) module; a first static random access memory (SRAM) buffer; a multiplexer (Mux), an end to end (E2E) protection module, a bypass module, a keys module, an encryption (XTS) module; an error correction module; a pattern detector module; a second SRAM buffer, and a flash interface module (FIM), wherein the controller is configured to: perform a pattern detection operation in a sanitize block erase audit mode or a bypass of the E2E module in a sanitize crypto erase audit mode. The bypass module is coupled between the XTS module and the Mux. The pattern detector module is coupled between the FIM and the Mux. The second SRAM buffer, the error correction module, the XTS module, and the E2E protection module are configured to be in an idle state during the sanitize block erase audit mode. The E2E protection module works during the sanitize crypto erase audit and wherein results of the E2E protection module are bypassed and considered successful. The audit mode module is coupled to the Mux.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller comprises a bypass module, an end to end (E2E) protection module, and a pattern detector module in a data path, wherein the controller is configured to perform a sanitize crypto erase audit comprising:
reading data from the memory device;
storing the read data in a buffer;
performing error correction on the read data;
decrypting the read data;
bypassing the E2E protection module;
storing the data in volatile memory; and
delivering the data to a host device.

2. The data storage device of claim 1, wherein the controller comprises a key module for storing crypto keys.

3. The data storage device of claim 2, wherein the controller includes a central processing unit (CPU) and wherein the CPU is configured to trigger the data path of the controller.

4. The data storage device of claim 3, wherein the CPU is also configured to instruct the CPU to delete the crypto keys stored in the key module during the sanitize crypto erase audit.

5. The data storage device of claim 3, wherein the CPU is also configured to set the pattern detector module to active.

6. The data storage device of claim 1, wherein the controller comprises one or more of a direct memory access module (DMA), a first SRAM buffer, a multiplexer (Mux), an error correction module, a second SRAM buffer, a flash interface module (FIM), and an encryption (XTS) module.

7. The data storage device of claim 1, wherein the sanitize crypto erase audit occurs after a sanitize block erase audit.

8. A data storage device, comprising:
means for storing data; and
a controller coupled to the means for storing data, wherein the controller comprises:
a control path comprising a central processing unit (CPU) and an audit mode module; and
a data path comprising a static random access memory (SRAM) buffer; a multiplexer (Mux) coupled to the SRAM buffer and the audit mode module, a bypass module coupled to the Mux, and a pattern detector module coupled to the Mux, wherein the controller is configured to perform a pattern detection operation in a sanitize block erase audit or a bypass of an end to end (E2E) module in a sanitize crypto erase audit.

9. The data storage device of claim 8, wherein the bypass module and the Mux are configured to be used during the sanitize crypto erase audit.

10. The data storage device of claim 9, wherein during the sanitize crypto erase audit, results produced by the E2E module are bypassed using the bypass module and Mux.

11. The data storage device of claim 8, wherein the pattern detector module and the Mux are configured to be used during the sanitize block erase audit.

12. The data storage device of claim 11, wherein during the sanitize block erase audit, the pattern detector module is configured to determine whether a successful erase block pattern matching has occurred.

13. The data storage device of claim 12, wherein the controller is configured to emulate an E2E error upon determining that the erase block pattern matching was not successful.

* * * * *